Jan. 1, 1924
R. J. STOKES
FLEXIBLE COUPLING
Filed Nov. 22, 1921
1,479,755
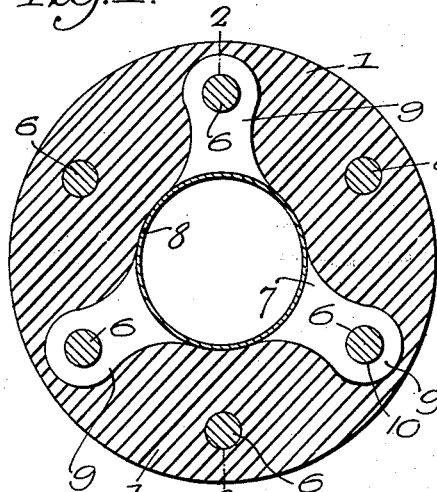
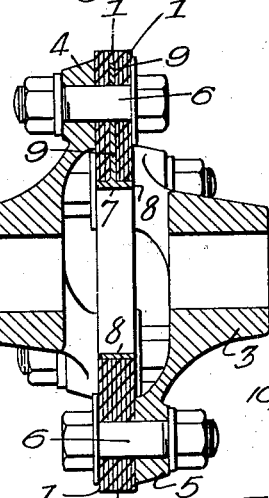
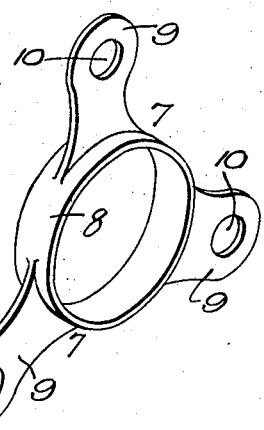
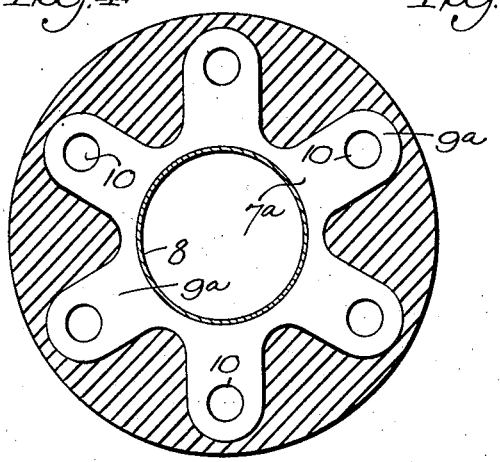
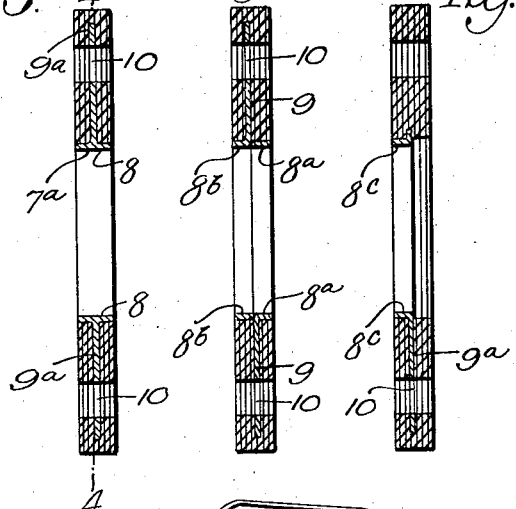
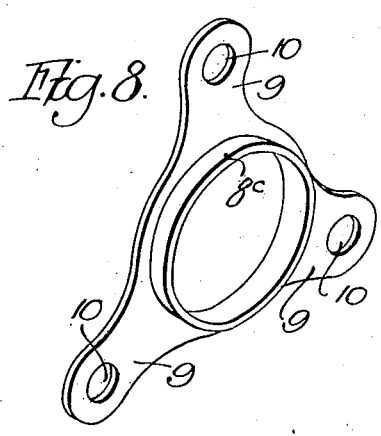
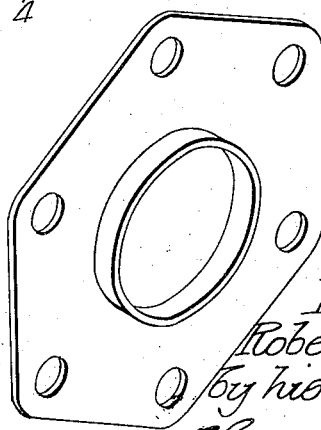
Inventor.
Robert J. Stokes
by his Attorneys Patented Jan. 1, 1924.

1,479,755

UNITED STATES PATENT OFFICE.

ROBERT J. STOKES, OF TRENTON, NEW JERSEY, ASSIGNOR TO THERMOID RUBBER COMPANY, OF HAMILTON TOWNSHIP, NEW JERSEY, A CORPORATION OF NEW JERSEY.

FLEXIBLE COUPLING.

Application filed November 22, 1921. Serial No. 517,002.

*To all whom it may concern:*

Be it known that I, ROBERT J. STOKES, a citizen of the United States, residing in Trenton, New Jersey, have invented certain Improvements in Flexible Couplings, of which the following is a specification.

My invention relates to certain improvements in flexible couplings of the type in which a flexible disk is secured to the arms of two spiders, the arms of one spider alternating with those of the other spider. One spider is secured to one shaft and the other spider is secured to the other shaft.

The object of my invention is to stiffen and strengthen the flexible disk, which is usually of rubber and fabric vulcanized, and to arrange the stiffening member so that it will prevent the warping of the disk when under torsional strains.

In the accompanying drawings:

Fig. 1 is a sectional view through a flexible disk illustrating my improvement, the section being on the line 1—1, Fig. 2;

Fig. 2 is a sectional view on the line 2—2, Fig. 1;

Fig. 3 is a perspective view of the reinforcing member;

Fig. 4 is a sectional view on the line 4—4, Fig. 5, illustrating a modification of the invention;

Fig. 5 is a sectional view on the line 5—5, Fig. 4;

Fig. 6 is a sectional view showing two reinforcing members;

Fig. 7 is a sectional view illustrating another modification of the invention;

Fig. 8 is a perspective view of the reinforcing member shown in Fig. 7; and

Fig. 9 is a view illustrating the reinforcing plate made in the form of a hexagon for application to a disk having a hexagonal outline.

Referring to the drawings, 1 is a flexible disk made, in the present instance, of fabric and rubber vulcanized under pressure. 2 and 3 are hubs having arms 4 and 5 respectively which are attached to the disk. The arms are alternately attached so that there will be a certain amount of flexibility of the disk between the points of attachment. 6 are bolts by which the disk is secured to the arms of the spiders. While I have shown a single disk, a series of disks may be used if desired.

Imbedded in each disk is a flexible metal section 7 having a body portion 8 in the form of a ring of substantially the thickness of the disk. Projecting from this ring, as illustrated in Fig. 1, are comparatively thin arms 9, which are perforated at 10 for the passage of the securing bolts 6.

As illustrated in Figs. 1, 2 and 3, the metal section 7 has three arms. These arms are engaged by the three bolts which secure the spider 2 to the disk. In many instances, this construction is sufficient to strengthen the disk and to keep the disk from being distorted when subjected to torsional strains.

In Figs. 4 and 5 is illustrated a modification in which the metal section 7ª has six arms 9ª corresponding to the arms of both spiders. These arms have sufficient flexibility so as not to interfere materially with the flexibility of the disk. In both instances, the flange, or ring section, 8 extends the full width of the disk.

In Fig. 6 another modification is illustrated in which there are two sections, each section having three arms. One section has a flange 8ª projecting towards one side of the disk and the other section has a flange 8ᵇ projecting towards the opposite side of the disk.

In Fig. 9 the metal section is shown hexagonal in form, but it will be understood that the shape may be varied without departing from the spirit of the invention.

Figs. 7 and 8 illustrate a reinforcing member having arms 9ª and having a flange 8ᶜ on one side only, the member being pressed from a single sheet of metal.

I claim:

1. A flexible disk for couplings made of fabric and rubber, said disk having a series of holes for the passage of securing bolts; and a flexible, metallic section imbedded in the disk, said section having a central ring portion and also having holes aligning with some of the bolt holes in the disk.

2. A flexible disk for flexible couplings made of fabric and rubber vulcanized and having imbedded therein a metallic section having a central ring portion protecting the inner edge of the disk, said metallic section having perforate arms, the disk being perforated in line with the perforations of the arms and through which the securing bolts are passed which secure the disk to the spiders of a coupling.

3. A flexible disk for couplings having an open center and a series of perforations for the passage of bolts and having imbedded therein a flexible metallic section flanged on both sides at the center to form a protecting ring for the inner edge of the disk, said metallic section having arms extending towards the periphery of the disk, said arms being perforated in line with the perforations of the disk.

ROBERT J. STOKES.